United States Patent [19]

Heinrich

[11] Patent Number: 5,052,048

[45] Date of Patent: Sep. 24, 1991

[54] CRIME DETERRENT SYSTEM

[76] Inventor: Robert G. Heinrich, 8303 Chianti Ct., San Jose, Calif. 95135

[21] Appl. No.: 400,692

[22] Filed: Aug. 30, 1989

[51] Int. Cl.[5] .................................... H04B 7/00

[52] U.S. Cl. .................................... 455/66; 455/99; 340/991; 379/45

[58] Field of Search .................... 455/66, 78, 100, 99, 455/1; 340/426, 539, 902, 988, 991, 992; 342/457; 379/45

[56] References Cited

U.S. PATENT DOCUMENTS 3,881,060 4/1975 Connell et al. ..................... 379/45

4,764,978 8/1988 Argo et al. ............................ 455/1

*Primary Examiner*—Reinhard J. Eisenzopf

*Assistant Examiner*—Edward Urban

*Attorney, Agent, or Firm*—Lloyd F. Seebach

[57] ABSTRACT

The invention relates to a crime deterrent system in which passive pursuit of a randomly moving subject involved in a crime is monitored by a central control station having input as to the exact location and direction of movement of the subject from at least one of a plurality of persons in the area provided with a radio transmitter tunable only to the central control station. Such a radio transmitter is used in conjunction with a radio receiver tunable to any one of the AM or FM audio frequencies available in the area for receiving an alerting signal related to the crime and to a selected FM audio frequency for receiving descriptive information as to the subject.

4 Claims, 2 Drawing Sheets

20
ALARM SYSTEM
TELEPHONE SYSTEM
21
22
ALERTING SIGNAL
DESCRIPTIVE INFORMATION
CORRECTIVE INFORMATION
10
26
17
14
15
14
16
14

CRIME DETERRENT SYSTEM

FIELD OF THE INVENTION

The present invention relates to a crime deterrent system and, more particularly, to a system in which passive pursuit of a perpetrator of a crime can be realized. In this system the public, in effect, plays an important role in helping to bring about apprehension of the perpetrator by transmitting to a central control station the observed location and direction of movement of the subject or crime perpetrator irrespective of the manner of movement of the subject.

DESCRIPTION OF THE PRIOR ART

A search of the prior art revealed a number of U.S. patents disclosing systems in which a vehicle whose location is unknown transmits a short modulated radio frequency pulse. A set of stations arranged about the periphery of an area compare the received pulse with a standard time reference signal. The phase difference is used to determine the arrival time differences at the known locations of the receiving stations and from such differences location of the vehicle can be determined. Such a system is disclosed in U.S. Pat. No. 3,680,121.

A system for noting the existence cf a distress-condition of an automobile, or other vehicle, and for locating the automobile relative to monitoring stations employs a transmitter in the automobile which transmits a multidirectional signal indicative of the nature of the trouble in a limited geographical area around the automobile. This system which also necessitates that the vehicle carry a signal transmitting device is disclosed in U.S. Pat. No. 3,828,306.

In U.S. Pat. No. 4,596,988 a tracking system is shown which, when interrogated, automatically reports data corresponding to the location of an unknown missing article. This system allows one to find the location of an article which might have been stolen or accidently misplaced. However, this system, as with others, necessitates that the respondent or article include a signal transmitting device in order to ascertain its location via a central interrogating station.

Other similar systems are disclosed in U.S. Pat. Nos. 3,922,678, 4,112,421, 4,209,787, and 4,742,357. While the prior art discloses systems that are suitable for the particular purpose to which they are directed, none of the known systems in the prior art is suitable for the purposes of the invention as hereinafter described. It should be noted that in each instance the prior art requires a signal transmitting means associated with the particular vehicle or article being monitored for location or retrieval.

SUMMARY OF THE INVENTION

The object of the present invention is to provide a system by which a subject, such as, a person or a person associated with a vehicle involved in perpetration of a crime can be passively pursued with the exact location and direction of movement of the subject being monitored and known at all times.

Another object of the invention is to provide a system by which passive pursuit of a subject involved in a crime eliminates the possibility of any accident that may and frequently occurs when apprehension by police of a person associated with a vehicle in perpetration of a crime is chased at high speed through city or suburban streets.

A still further object of the invention is to provide a passive pursuit system in which any one having an AM/FM radio receiver in their possession, or access to a TV set, and having a radio transmitter tunable to only a selected FM audio frequency can be made aware of the fact that a crime is being committed or has been committed in the immediate vicinity and by means of the radio transmitter can inform a central control station, upon sighting the subject involved in the crime, as to the subject's location and direction of movement without further involvement in the matter.

It is a further object of the invention to provide a passive pursuit system in which information relating to a crime noted as being committed can be immediately transmitted to a central control station without having to make use of any other special media, such as, a telephone call or finding a police officer to whom the crime might be reported, thereby providing for immediately disseminating the information and initiating a passive pursuit in collaboration with the police These and other objects of the invention will be apparent to those skilled in the art by the description which follows.

Briefly, a crime deterrent system which involves passive pursuit of a randomly moving subject, whether the subject be an individual or one or more persons associated with a vehicle used in perpetration of a crime, requires only a simple radio transmitter tunable to only a selected FM audio frequency with a limited range (10–15 miles). Such a radio transmitter is used in conjunction with a radio receiver tunable to the normal audio frequencies in the AM and FM frequency bands available within the area. Further, such a radio transmitter is a purchaseable item and can be an item required with registration of a vehicle, boat, plane etc..

Information related to a crime being committed or having been committed can be provided as to the location and direction of movement of the subject involved in the crime by means, such as, an alarm system interconnected to a central control station, a phone call, a roving police patrol car and by any one in the locality of the crime having a radio transmitter of the type described above.

Upon receipt by the central control station of information relating to a crime in the course of being committed, or having been committed, an alerting signal is immediately broadcast by the central control station via all available AM and FM audio frequencies, as well as any available TV audio frequency or in cooperation with the TV channels by means of a tape presented as a visual alerting signal on the TV screen. The alerting signal warns the listener or viewer of the crime and that further information relating to the crime is to be immediately broadcast over a selected FM audio frequency. At this point, any one receiving the information can then decide whether to participate in cooperation with the police in the passive pursuit of the subject.

When the alerting signal has been received by a person having an AM/FM radio receiver, whether on foot, in a vehicle, etc., if an election has been made to aid in the passive pursuit, then the person can immediately tune the AM/FM radio receiver to the selected FM audio frequency. In this manner, all relevant information pertaining to the crime can be made known to a large number of persons in the area. If a person espies the subject in the immediate area, the location and direction of movement of the subject can be transmitted to the central control station via the radio transmitter in their possession which is tunable only to a second selected FM audio frequency. This up-dated information can then be rebroadcast by the central control station via the first selected FM audio frequency and the normal police radio frequency band so the location and direction of movement of the subject is continually monitored and relayed to all police units based on continually updated information.

In effect, the system as described is greatly enhanced when a large number of the radio transmitters are in the hands of as many persons as possible. In this manner, the greater the number of transmitters available for transmitting up-dated information to the central control station as to the exact location of the subject, the more effective the passive pursuit becomes. The AM/FM radio receivers in existence and in possession of the public in homes, vehicles, boats, planes, stores, etc., as well as the radio equipment utilized by the police, are no different in operation or use than at present. However, it will be apparent that the first selected FM audio frequency must be known to the general public for receiving any corrective or up-dated information relative to the subject in order to make the passive pursuit system most efficient.

DESCRIPTION OF THE DRAWING

Reference is now made to the accompanying drawing wherein like reference numerals and characters designate like parts and wherein.

DESCRIPTION OF PREFERRED EMBODIMENTS

Figure 1:
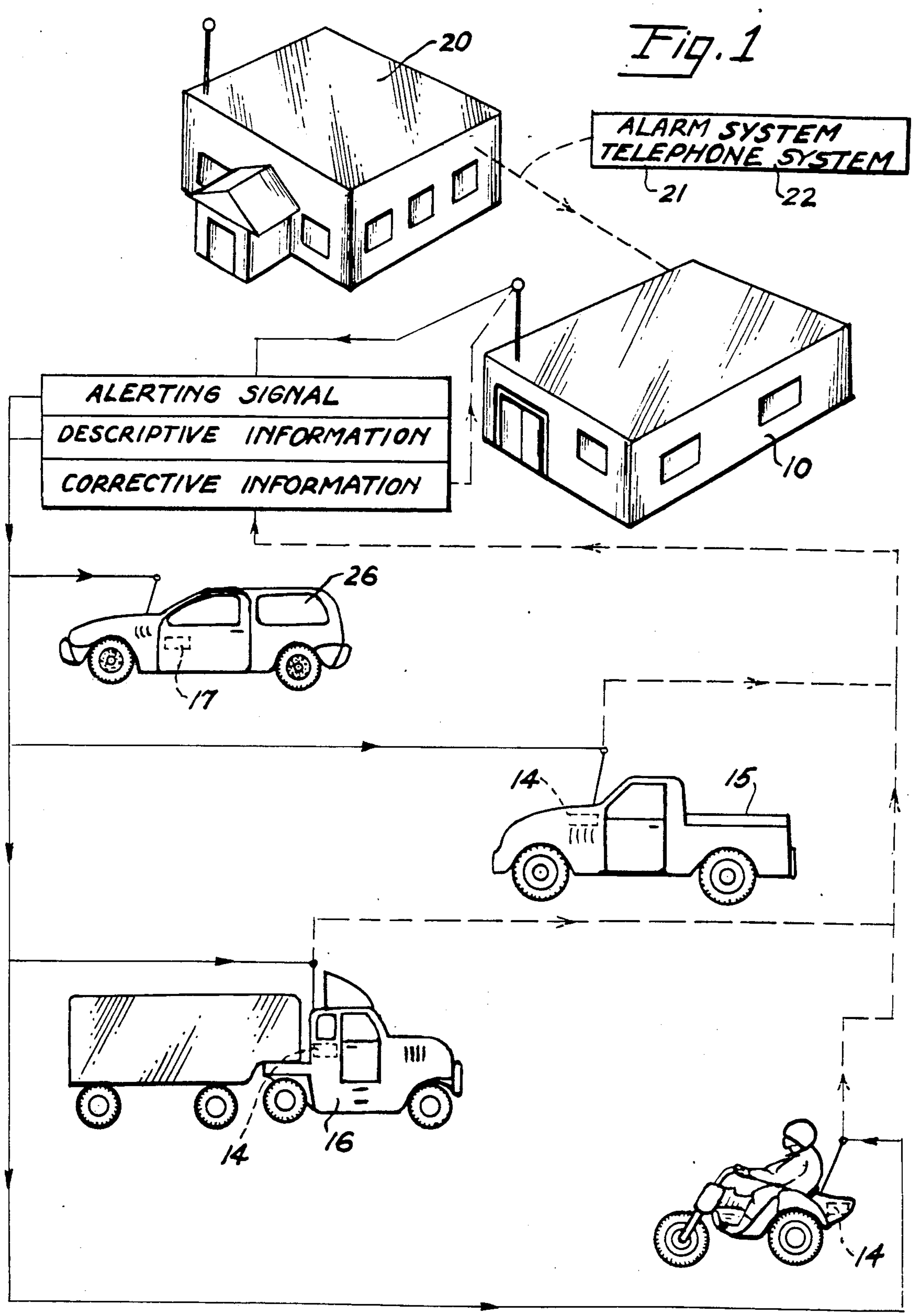
FIG. 1 is a diagrammatic perspective view illustrating position of various vehicles and the operation of the invention when utilized to monitor the location and direction of movement of a subject, such as, a vehicle and/or a person involved in the perpetration of a crime.
Figure 2:
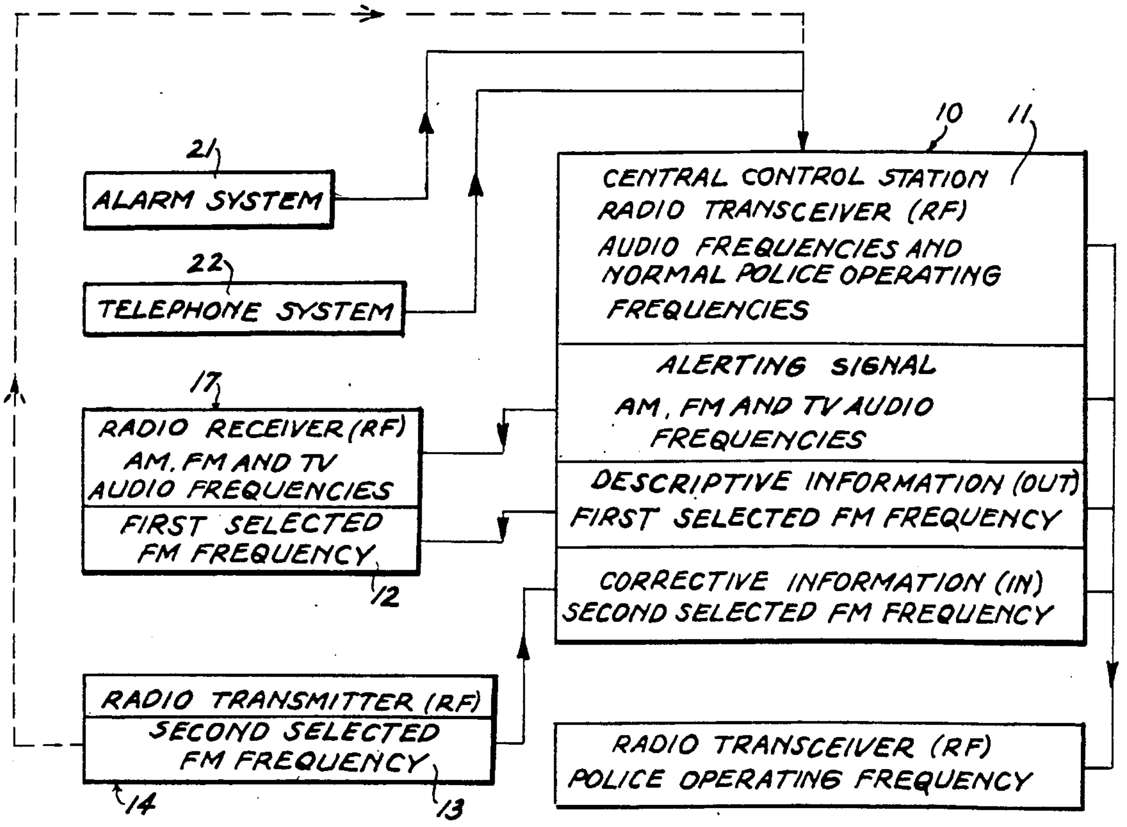
FIG. 2 is a block diagram of the interrelationship of the radio frequency units comprising parts of the overall system.

With reference to FIG. 1, a central control station, as designated by the numeral 10, can be a police, highway patrol or sheriff station. Such a station is provided with appropriate radio equipment, such as, a transceiver 11, see FIG. 2, capable of transmitting and receiving in available AM, FM and police audio frequencies. In addition to transmitting and receiving via the aforementioned frequencies, the central control station 10 is also capable of transmitting information via a first selected FM audio frequency and for receiving information via a second selected FM audio frequency, as indicated by the numerals 12 and 13, respectively as seen in FIG. 2. A radio transmitter 14 which is tunable only to the second selected FM audio frequency is one that can be purchased by an individual or must be purchased by an owner of a vehicle upon registration thereof, if such a requirement is or may be made mandatory by law. The radio transmitter 14 can be used only for the transmitting of information to the central control station 10 via the second selected FM audio frequency, as described in more detail hereinafter.

Most vehicles, such as, an automobile designated by the numeral 15, or a truck or van designated by the numeral 16, as see in FIG. 1, carry or are provided with a radio frequency receiver 17 tunable to the AM and FM audio frequencies available in an area or locality. Since the central control station 10 is capable of transmitting and/or receiving AM/FM radio frequency signals via the transceiver 11, the central control station can broadcast an alerting signal via both the available AM and FM audio frequencies to indicate to any person in the area who has their radio receiver tuned to one of the frequencies that a crime has been committed or is in the process of being committed. It should be pointed out that the public will have been advised beforehand of the AM/FM audio frequencies to be used in conjunction with the system being described. Also, many people, although on foot, carry a radio receiver 17 and, hence, can be a part of the system if provided with or possessing a radio transceiver 14.

As is well known, an announcement on TV of a storm, bad driving conditions, etc., is usually made by means of a movable tape which appears on the TV screen without interruption of the current TV program Such warning is, therefor, of visual rather than audio reception. Hence, an alerting signal could be produced using the tape format, or a designated bleep or series of bleeps superimposed on the TV audio frequency and with respect to which the public has already been informed In either case, the viewer will have to tune a radio receiver to the first selected FM audio frequency to obtain the descriptive information transmitted by the central control station 10.

A person on foot, a driver of a vehicle 15 or truck 16, a person watching TV, etc., if aware of the alerting signal and interested in aiding the police in apprehending the perpetrator of a crime, can tune a FM receiver 17 to the first selected FM audio frequency for receiving descriptive information relating to the crime, such as, location, type, manner of get-away, etc.. A crime in the course of being committed may involve a bank robbery, a hit-and-run accident, or some similar felony that would necessitate immediate police action. In the case of robbery of a bank 20, a bank alarm system 21 could be set off and, if interconnected to the central control station 10, would serve to immediately inform the police of the robbery. At some other location, the preliminary information as to the commission of a crime can be transmitted to the central control station 10 by an interconnected alarm, by a telephone call 22 made by a person in the immediate vicinity or by a person or motorist in the vicinity and having a radio transmitter 14.

Figure 3:
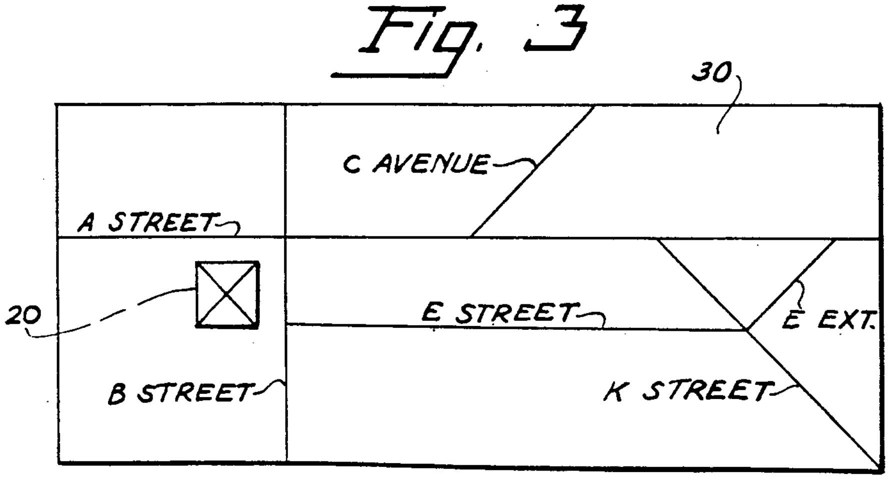
FIG. 3 is a portion of a map showing graphically the manner in which the subject involved in a crime can be followed an monitored at a central control station for directing police units to the exact location of the subject.

With respect to FIG. 1 and FIG. 3, the actual working or the passive pursuit system can be best explained and described in connection with an actual scenario associated with the disclosure in these two figures of the drawing. In FIG. 1, the bank 20 is being or has been robbed and the perpetrator of the crime was seen leaving the scene of the crime in a vehicle 26 of a certain make, color, etc.. With the occurrence of the crime or immediately thereafter, the alarm system 21 interconnected to the central control station 10 indicates the commission of the crime. This preliminary information as to the location of the crime, the vehicle per se and perhaps even including some description of the person involved in the crime, is immediately transferred to the central control station 10. As already noted , some or additional information can be transmitted to the control station by any one or combination of the telephone call 22 and/or a radio transmitter 14 by a person or motorist in the immediate vicinity of the crime. Once this preliminary information has been received by the central control station and, preferably, upon first receipt of such information, an alerting signal is broadcast via the available AM and FM audio frequencies. Any one on foot, in a vehicle or viewing TV and having an AM/FM radio receiver 17 that is tuned to one of the available AM and FM frequencies will receive the alerting signal, as well as any one viewing TV. Those persons interested in cooperating with the police can then tune the radio receiver 17 to the first selected FM audio frequency over which the descriptive information relative to the subject is being broadcast by the central control station.

The person on foot or in a vehicle and moving in the are can then be on the look-out for the subject and, if sighted, the site of the subject in the area can be transmitted to the central control station 10 via the radio transmitter 14 via the second selected FM audio frequency.

Upon receipt of information from one or more of the radio transmitters 14, the central control station 10 can correct any previous information and pin point the exact location and any new direction of travel taken by the subject. The corrective information can then be broadcast via the second selected FM audio frequency to the persons tuned to such frequency. As shown in FIG. 3, the map 30 illustrates just how the monitoring can take place. If it is assumed the subject has robbed the bank 20, the central control station 10 has been warned by the bank alarm system and an alerting signal has been broadcast via any one or each of the available AM, FM and TV frequencies and followed by descriptive information broadcast via the first selected FM audio frequency, then the subject will be under surveillance by those persons interested in aiding the police.

If it is assumed the subject in vehicle 26 left the bank and headed east along A Street, a motorist, approaching A Street from C Avenue or K Street, or any one of those streets, and having a transmitter 14, may see the subject and knowing what has taken place can transmit via the transmitter 14 to the central control station the location and direction of movement of the subject and vehicle 26. This information can be immediately broadcast to the police patrol with the necessary instructions as to the action to be taken. Whatever information may be deemed necessary by the police to maintain passive pursuit of the subject can be broadcast over the first selected FM audio frequency for providing corrective information to those persons participating in the passive pursuit.

If the subject should change direction of movement; for example, make a right-hand turn onto K Street, then any one in the locale of E Street or E Ext. can transmit this change in direction of movement to the central control station 10. It should be evident that the passive pursuit, as explained and described hereinabove, is one that does not require high speed chasing or following of the subject.

The continual monitoring of the location and of any change in direction of movement of the subject produces a definite psychological effect with respect to the subject, such as, being in a maze and lost therein. This is easily accomplished and with such a passive pursuit system, the subject can be apprehended by the police at their discretion without harm to anyone, including pedestrians, other motorists, as well as police personnel and equipment. It should also be pointed out that the psychological effect is even more pronounced if the subject has an AM/FM radio receiver tuned to the first selected FM audio frequency because the subject is then continually aware of a net, in effect, being drawn about him irrespective of any change that may be made in his direction of movement.

While the system of passive pursuit has been described in connection with a particular perpetrated crime, it should be understood that the police, while charged primarily with the maintenance of law and order, become involved with many other facets or help and aid to the public. To this end, the passive pursuit system described hereinabove is applicable to other problems that might be required of the police. For example, the described system can be used as an aid in locating a missing person or child, a person subject to Alzheimer disease who is known to be lost and wandering about in a known area, an animal, wild or domesticated, that is on a rampage and causing a disturbance of some sort in an area, etc., to mention but a few. Hence, in its broadest sense, the passive pursuit system can be used to monitor any subject that is randomly moving about within a prescribed area. Accordingly, the subject can be of any type and can be on foot, on a bicycle or motorcycle, or in a vehicle of any kind, including a boat or airplane.

In any case, the primary requesite is that the radio transmitter 14 be available to as many persons as possible and in as many locations as possible, thereby obtaining a maximum coverage to produce a most efficient passive pursuit system. Hence, the system described hereinabove is considered to fulfill a need that is desperately required in law enforcement at the present time.

Accordingly, the invention has been described in detail with particular reference to preferred embodiments thereof but it will be understood that various changes and modifications can be effected within the spirit of the invention.

I claim:

1. A crime deterrent system for monitoring passive pursuit of a subject randomly movable within an area which comprises:

means within the area for providing preliminary information to a central control station relative to the moving subject, its location and its direction of movement;

a plurality of radio frequency receivers, each of which is operable by a person randomly located within the area and is tunable to at least one of any available AM, FM and TV frequency for receiving an alerting signal from the central control station upon receipt of the preliminary information and descriptive information relative to the subject from the central control station when tuned to a first selected FM audio frequency;

radio transmitting means associated with each radio frequency receiver and operable by the person, the radio transmitting means being tunable to only a second selected FM audio frequency for transmitting corrective information to the central control station, upon sighting the subject, for relating any change in location and direction of movement of the subject that is different from the descriptive information first received by the central control station; and radio transceiver means associated with the central control station for receiving the preliminary information, the descriptive information and the corrective information from at least one person via the providing means, the radio frequency receivers and the radio transmitting means and for transmitting the alerting signal, upon receipt of the preliminary information, via at least one of the available AM, FM and TV frequencies and the first-received descriptive information followed by the corrective information via the first selected FM audio frequency, thereby monitoring for passive pursuit the exact location and direction of movement of the subject.

2. A crime deterrent system for monitoring passive pursuit of a subject randomly movable within an area in accordance with claim 1 wherein means for providing the preliminary information comprises at least one of an alarm system and a telephone system interconnectable to the central control station and the transmitting means tunable to only the second selected FM audio frequency.

3. A crime deterrent system for monitoring passive pursuit of a subject randomly movable within an area in accordance with claim 2 wherein the radio transmitting means is tunable to only a second selected FM audio frequency for transmitting only the preliminary information and the corrective information directly to the central control station.

4. A crime deterrent system for monitoring passive pursuit of a subject randomly movable within an area in accordance with claim 1 wherein each radio frequency receiver is independently associated with a radio transmitting means so as to be operable by the same person within the area, thereby providing a continual interchange of the corrective information for monitoring the passive pursuit of the subject.

* * * * *